United States Patent [19]

Seaman

[11] Patent Number: 4,546,589
[45] Date of Patent: Oct. 15, 1985

[54] SINGLE-PLY SEALED MEMBRANE ROOFING SYSTEM

[75] Inventor: Richard N. Seaman, Millersburg, Ohio

[73] Assignee: Seaman Corporation, Millersburg, Ohio

[21] Appl. No.: 255,543

[22] Filed: Apr. 20, 1981

[51] Int. Cl.⁴ .................. E04D 5/06; E04D 5/14; E04D 19/08
[52] U.S. Cl. ...................... 52/518; 52/552; 52/748
[58] Field of Search ............. 52/518, 519, 521, 540, 52/543, 545, 419, 528, 550, 551, 552, 747, 748, 527; 156/157, 497, 499; 428/906

[56] References Cited

U.S. PATENT DOCUMENTS

| | | | |
|---|---|---|---|
| 322,153 | 7/1885 | Blair et al. | 52/519 |
| 332,570 | 12/1885 | Stewart . | |
| 835,889 | 11/1906 | Moeller | 52/521 |
| 855,757 | 6/1907 | Crabbs et al. | 52/545 |
| 1,044,773 | 11/1912 | Gillett | 52/419 |
| 1,908,313 | 5/1933 | Brown | 52/543 |
| 1,994,643 | 3/1935 | Harshberger | 52/528 |
| 2,003,503 | 6/1935 | Eason | 52/545 |
| 2,031,993 | 2/1936 | Varden | 52/545 |
| 2,106,396 | 1/1938 | Topping | 52/518 X |
| 2,125,694 | 8/1938 | Sattig | 52/540 |
| 2,153,887 | 4/1939 | Greider | 52/540 |
| 2,247,945 | 7/1941 | Gardner | 52/748 |
| 2,271,728 | 2/1942 | Bainbridge | 52/105 |
| 2,376,907 | 5/1945 | Davis | 52/518 X |
| 3,292,334 | 12/1966 | Craig | 52/419 X |
| 3,914,916 | 10/1975 | Simpson | 52/748 |
| 3,937,640 | 2/1976 | Tajima et al. | 52/518 X |
| 4,087,309 | 5/1978 | Lang | 156/497 |
| 4,239,581 | 12/1980 | Lang | 156/499 X |
| 4,259,142 | 3/1981 | Kortepeter | 156/497 |
| 4,289,552 | 9/1981 | Hammer | 156/499 X |

FOREIGN PATENT DOCUMENTS 2359674  6/1975  Fed. Rep. of Germany .

OTHER PUBLICATIONS

Snoke, Hubert R., Building Mat'ls & Structures, Report BMS 70, National Bureau of Standards, 1941, p. 15.

Primary Examiner—John E. Murtagh
Attorney, Agent, or Firm—Renner, Kenner, Greive & Bobak Co.

[57] ABSTRACT

A single-ply roofing system comprising parallel strips of membrane (10) laid on a roof deck (14) with at least one side edge of each strip secured to the deck by mechanical fasteners (16), the side edges of contiguous strips being bonded together, each strip having transverse membrane flaps (11) secured to its undersurface at longitudinal intervals and the flaps being secured to the deck by mechanical fasteners (16).

22 Claims, 5 Drawing Figures

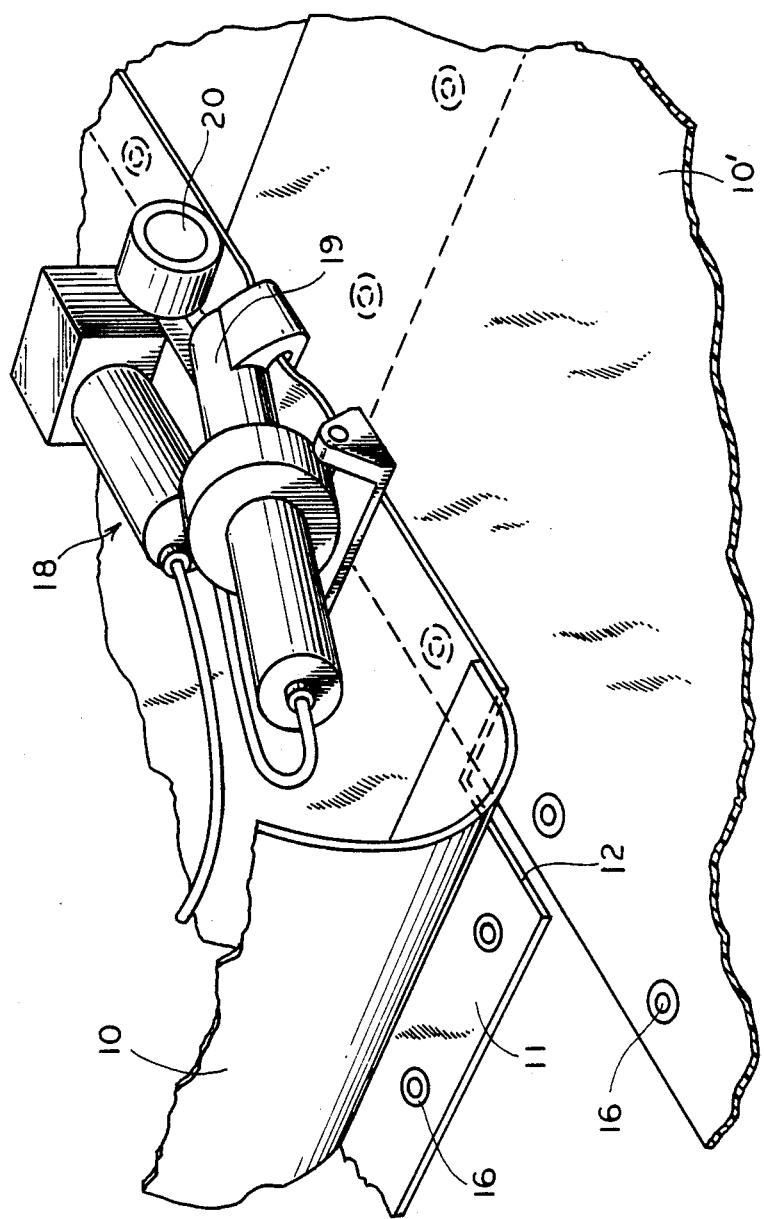

SINGLE-PLY SEALED MEMBRANE ROOFING SYSTEM

TECHNICAL FIELD

The invention relates to roofing systems comprising strips of synthetic elastomeric membrane secured to a roof deck with the strip edges overlapped and bonded, providing a smooth, flexible and durable finished surface.

BACKGROUND ART

Built-up roofing systems have been used for many years on flat deck roofs. Originally, several layers of tar paper were laid by coating the deck and applying paper strips with hot tar. Later, the tar paper was replaced by layers of felt or fibrous material and the hot tar was replaced by hot asphalt. In either case, each strip of paper or felt was overlapped about three-quarters of the width of the previous sheet so that the completed roof was multi-ply system. In some cases a top layer of crushed stone or gravel ballast was applied to aid in resisting uplift forces.

Originally, no insulation layer was used and the temperature of the air inside a building helped to counter the contrasting outside temperature and kept the membrane within a moderate temperature range. In recent years rising fuel costs have made it desirable, if not necessary, to use a layer of insulation next to the roof deck. As a result the difference between temperatures inside and outside of the building was greatly increased both winter and summer, subjecting the built-up plies to increased temperature ranges resulting in increased expansion and shrinking stresses causing cracking and splitting, and consequent leakage.

The labor cost of installing built-up roofs and the cost of asphalts used in the strip material and in the application thereof have been rapidly increasing in recent years. Consequently, cheaper materials have been used with the inevitable result that such roofs fail prematurely and experience leakage problems within the first five years after installation.

Moreover, the use of hot asphalt produces substantial amount of fumes, creating an objectionable pollution problem violating EPA regulations, and possibly state regulations in certain areas.

Various solutions to these problems have been suggested including the single ply membrane systems which generally utilize elastic rubber or plastic strips of various widths. The rolled strips are unrolled onto the roof deck and attached to the deck by suitable adhesive or mechanical fasteners, or both, and seamed together at the edges. Hot tar or asphalt is not usually required. The membranes being used, of which I am aware, include synthetic elastomers or rubbers, and thermoplastics, reinforced and nonreinforced.

Essentially, three types of single-ply systems employing such membranes are being used. One is a fully adhered system wherein the membrane is adhesively secured to the entire surface area of the roof deck and the edges of the membrane strips or sheets are seamed, usually having their marginal edges overlapped and bonded.

The second type is a so-called loose-laid system in which the membrane is fastened only at the perimeter and held down over the entire area by a layer of ballast amounting to 10 to 15 pounds per square foot, to resist uplift forces.

The third type is a mechanically fastened system in which the membrane is secured to the deck at intervals with mechanical fasteners and the edges of the membrane strips are bonded together.

One variation of a mechanically fastened system utilizes numerous mechanical fasteners to secure the membrane at close enough intervals along the strip edges so that uplift forces are absorbed at the fastening points and no gravel ballast is required. Any of the fasteners which are exposed must be waterproofed at additional cost. Another variation is to use a large number of plastic disks or washers mechanically fastened to the deck at close intervals and apply adhesive to the disks as the membrane is unrolled over them. The adherence of the membrane to the disks is relied upon to withstand uplift and no gravel ballast is used.

The fully adhered single-ply system has numerous advantages over the built-up roof system, including longer life, weatherability and greater integrity due to improved membranes, reduction of maintenance costs and elimination of hot asphalt. However, adhering the membrane to the entire deck surface is a very expensive operation from the standpoint of labor and the high cost of a special adhesive which can be applied without heating. Moreover, most such adhesives can not be applied in high moisture environments or in cold temperatures. The overall cost of the fully adhered single-ply system is generally more than the conventional built-up system. Further, error-free installation is required as errors in one ply are not repaired or covered over by the additional plies as in built-up systems. Other problems include flex fatigue of the membrane and subsequent cracking due to continual stressing of the material in isolated areas due to daily expansion and contraction of the deck.

The loose-laid single-ply system using a top layer of ballast eliminates the material and labor cost of the special adhesive but is still quite labor intensive. Moreover, many existing roofs have not been built strong enough to carry the additional weight of the ballast in addition to the other loading requirements. Accordingly, new roofs must be designed to support the required weight of the ballast amounting to 10 to 15 pounds per square foot in addition to the other loads. Further, the ballast tends to concentrate the stress loads due to expansion of the roof deck, as in some areas the ballast does not move during expansion and contraction of the building, again concentrating the stress and causing flex fatigue of the membrane and premature failure.

Mechanically fastened single-ply systems without gravel ballast on top reduce the concentration of stress loads on the membrane, but in order to withstand the uplift forces the membrane must be fastened to the deck at close intervals over the entire area, minimizing the areas of membrane not secured to the deck. If the strips of membrane are secured only along the bonded side edges, the width of the strips should be restricted to a dimension (about 5-6 ft.) in order to ensure adequate resistance to uplift in the membrane between fastening locations.

Mechanically fastened single-ply systems utilizing plastic disks fastened to the deck at close intervals and coated with adhesive in situ as the membrane is unrolled over them require additional labor in applying the adhesive, as well as the added cost of the adhesive. In addition, the reliability of the adhesive can be decreased by long term heat and moisture exposure, causing premature wind uplift failure.

DISCLOSURE OF INVENTION

The present invention provides an inexpensive mechanically fastened single-ply roofing system of improved durability under a wide range of climatic conditions, and capable of withstanding uplift forces without top ballast.

It is an object of the present invention to provide an improved economically installed fastening system for a single-ply roofing system which will withstand uplift forces and at the same time permit roof deck expansion forces to dissipate over a large surface area of the roof membrane.

Another object is to provide an improved single-ply roof deck covering system which is adapted for use on roof decks of wood, metal, concrete and existing built-up roof decks, and on steep pitched decks as well as flat decks.

Another object is to provide an improved roof deck covering system which enables transferring to the membrane fabricating plant a substantial amount of the labor normally performed on the roof deck, thereby increasing efficiency and reducing labor cost, as well as assuring reliable product quality by providing better quality control, better working environment, and better trained labor.

A further object is to provide an improved fastening system which permits the use of wide rolls or strips of membrane thereby minimizing the aggregate amount of heat bonding of the seams required on the roof deck at the overlapped side edges.

A still further object is to provide an improved mechanical fastening system in which each strip of membrane is provided with transverse flaps on its under surface at close longitudinal intervals for attachment to the deck, and the longitudinal marginal edges of the strips are mechanically fastened to the deck and sealed together in situ.

Still another object is to provide an improved mechanically fastened single-ply roofing system in which the transverse flaps of laterally contiguous strips are staggered with respect to each other so as to interrupt wind lift forces moving across the membrane.

These and other objects are accomplished by the improvements comprising the present invention, preferred embodiments of which are disclosed herein by way of example as representing the best known mode of carrying out the invention. Various modifications and changes in details of construction and operation are comprehended within the scope of the appended claims.

BRIEF DESCRIPTION OF DRAWINGS

FIG. 5 is an enlarged schematic perspective view showing a preferred method of sealing the overlapped marginal edges of contiguous strips.

PREFERRED EMBODIMENT OF THE INVENTION

Figure 1:
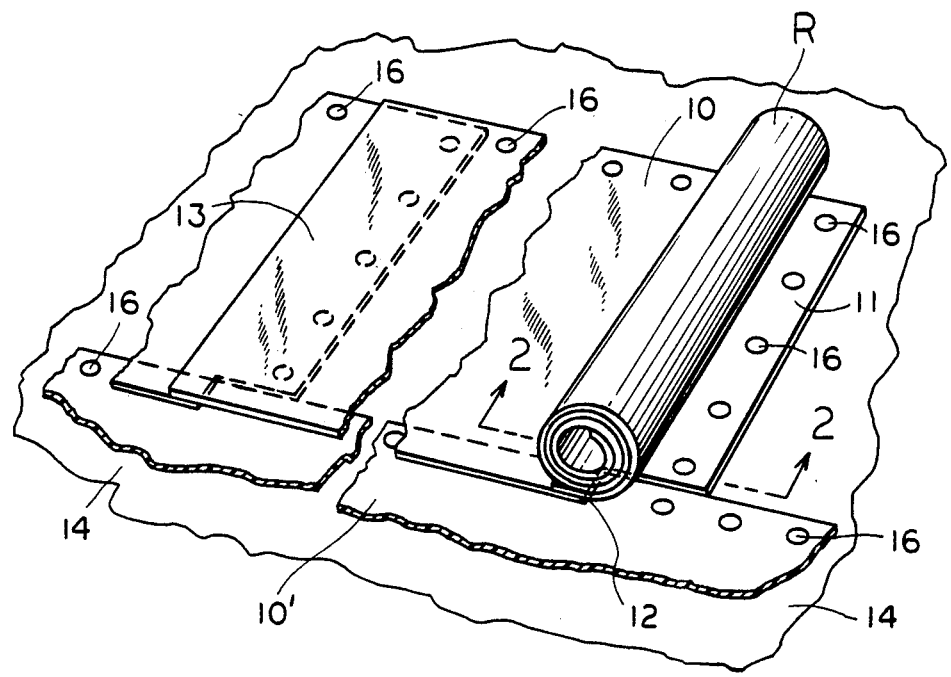
FIG. 1 is a schematic perspective view of a partially unrolled membrane strip being fastened to a roof deck in overlapping relation to a previously fastened strip.

The single-ply roofing system comprising the invention is adapted for use with a variety of membrane materials including synthetic rubbers or elastomers such as Neoprene and ethylene-propylene-diene monomer (EPDM), and thermoplastic synthetic resins such as chlorinated polyethylene (CPE) and polyvinyl chloride (PVC). Such materials are available in thicknesses ranging from 0.030" to 1/16" or more.

I prefer to use a membrane of thermoplastic polymeric material which contains a minimal amount of plasticizer so that no material migration of plasticizer occurs causing loss of flexibility over long periods of use. However, the particular composition of the membrane per se forms no part of the invention. The membrane is preferably about 0.030" in thickness and is reinforced with synthetic fibers in order better to improve puncture resistance and to withstand uplift forces. In the drawings the thickness of the membrane is exaggerated for clarity.

Figure 2:
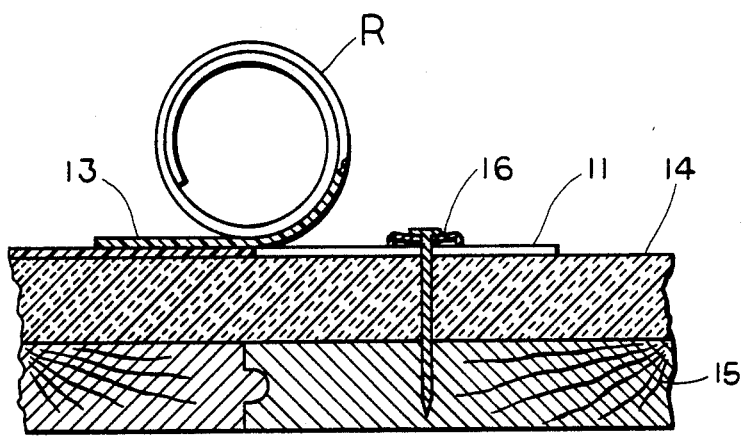
FIG. 2 is an enlarged sectional view on line 2—2 of FIG. 1, showing the manner of securing one of the transverse flaps to the roof deck.

As shown in FIGS. 1 and 2, the improved membrane strips 10 are provided at longitudinal intervals with transverse flaps 11 secured along their contiguous portions to the underside of the strip. One end of each flap is preferably notched as indicated at 12 for a purpose to be described and the secured contiguous portion 13 is coextensive with the width of the strip. As shown, these flaps may be formed when the strip is made up at the factory by overlapping longitudinal strip portions and heat-bonding or otherwise adhering the marginal overlapping portion 13 of the upper strip to the contiguous portion of the lower strip, leaving the flap 11 free and unsecured.

Obviously, the same result can be obtained by securing transverse strips to the underside of a continuous longitudinal strip, in which case a portion of each transverse strip extending all along the flap portion would be secured to the underside of the continuous strip, leaving the flap free and unsecured.

As indicated, the improved strips 10 are supplied in rolls R and are unrolled on the roof deck which may comprise a substrate layer of insulation board 14 over a deck 15 which may be wood, as shown, or metal or the like. As a strip is unrolled each successive flap 11 is fastened to the deck at intervals by metal or other type of wellknown fasteners 16 which extend through the insulation board 14 into the deck 15, and the longitudinal edge of the strip opposite to the notched ends of the flaps is also fastened by fasteners 16 to the deck at intervals. The opposite longitudinal edge of the strip is laid preferably overlapping the fastened longitudinal edge portion of a previously laid strip indicated at 10'.

Referring to FIGS. 1 and 5, the overlapped longitudinal edge portion of the strip 10 is heat-welded or bonded to the fastened underlying edge portion of the strip 10'. The amount of overlap may vary from about 2 to 4 inches. The heat bonding may be done progressively using a conventional electric heat welder indicated generally at 18 which applies heat through a nozzle 19 to the overlapping edge portion of strip 10 and has a following roller 20 to aid in making a good bond. The notches 12 in flaps 11 are provided to ensure that the ends of the flaps do not detract from making a leak-proof bond between the overlapping edge portions of the strips 10 and 10'. When the heat-bonding of the overlapped longitudinal edge portions of the strips 10 is completed, all of the mechanical fasteners are completely covered, and hence no waterproofing of any fasteners is required.

Figure 3:
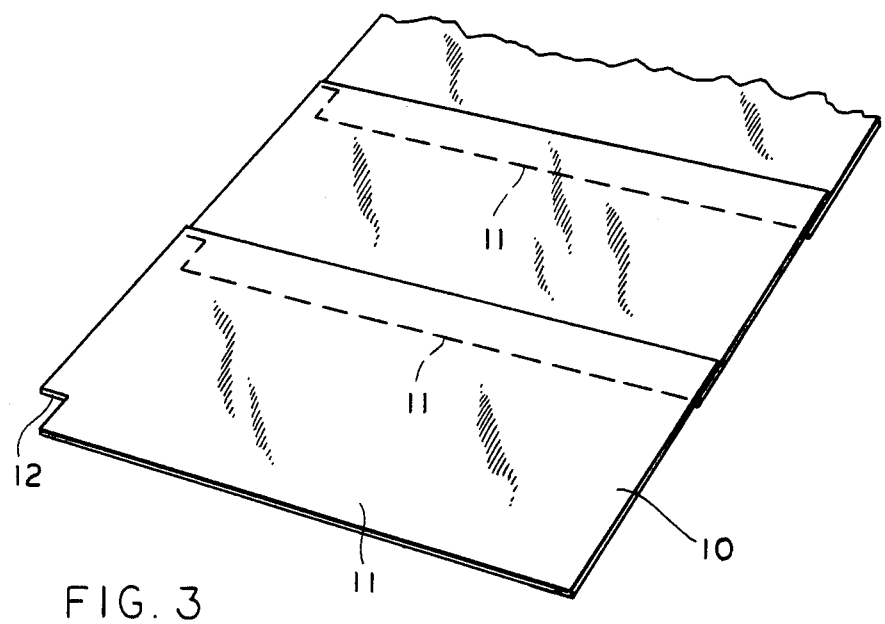
FIG. 3 is a schematic plan view of a portion of an unrolled strip of increased width.
Figure 4:
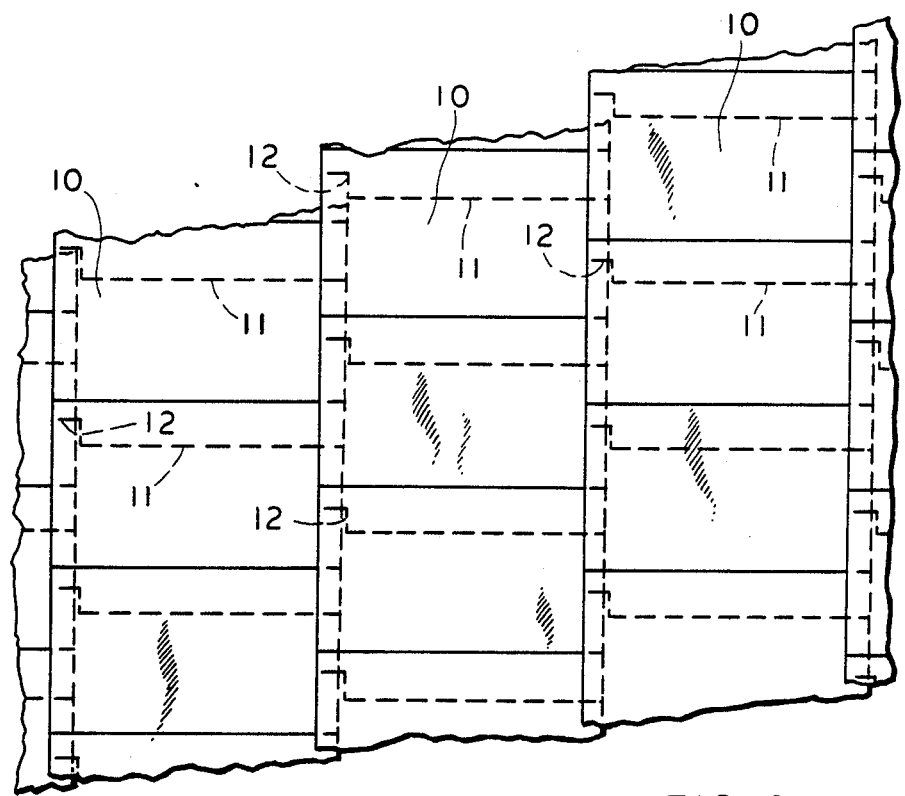
FIG. 4 is a schematic plan view showing several strips laid side-by-side with their marginal edges overlapped and their transverse flaps staggered.

As indicated in FIG. 4, the parallel strips 10 are laid in such manner that the fastened flaps of laterally contiguous strips are staggered with respect to each other so as to intercept or interrupt the uplift effect of wind lift forces moving across the roof deck. The preferred spacing between flaps on each strip usually should not be more than about five to six feet. The spacing can be varied depending upon strength of fabric, holding characteristics of the fasteners used, and upon the uplift forces involved with a particular roof deck. Accordingly, with the flaps staggered, the strips can be increased in width to 10, 15, 20 or more feet and still maintain the required resistance to wind uplift. For convenience the strips 10 in FIGS. 1 and 4 are shown relatively narrow, but in FIG. 3 a wider strip is indicated.

Because the width of the strips 10 can be substantially increased over widths previously in use, the time and labor of the heat-welding of the fewer overlapped seams is greatly reduced, and since this is a manual-on-site operation a large amount of the installation cost is saved. In prior systems where the contiguous strips are mechanically fastened to the deck only at their overlapped edges, the strips should not exceed more than about five feet in width in order to provide adequate resistance to wind uplift forces.

The present improved membrane strip and associated single-ply roofing system provides for rapid and economical installation with a minimum of manual heat-welding, and results in a leak-proof roof covering which adequately resists wind uplift forces without requiring ballast and dissipates roof deck expansion forces. The improved system enables the use of wide rolls of membrane, and is adapted for use on steep pitched roof decks as well as flat decks.

I claim:

1. The method of laying a single-ply sealed fiber-reinforced membrane covering over a roof deck comprising, providing rolls of membrane strips having transverse flaps of membrane substantially coextensive of width to said strips, one transverse edge portion of each flap being secured to the undersurface of said strips at longitudinal intervals, unrolling the strips successively in parallel side-by-side positions on the deck with their marginal side edge portions contiguous, mechanically fastening successive flaps of each strip at transverse intervals to the deck, mechanically fastening at least one marginal edge portion of each strip at longitudinal intervals to the deck, and bonding the marginal side edge portions of the strips together.

2. The method as described in claim 1, wherein the flaps are secured to the strips at intervals of about five to six feet.

3. The method as described in claim 2, wherein the successive flaps on laterally contiguous strips are staggered with respect to each other.

4. The method as described in claim 1, wherein the successive flaps on laterally contiguous strips are staggered with respect to each other.

5. The method as described in claim 1, wherein one marginal side edge portion of each strip is lapped over and bonded to the mechanically fastened marginal edge portion of the next contiguous strip.

6. The method as described in claim 5, wherein the flaps are secured to the strips at intervals of about five to six feet.

7. The method as described in claim 6, wherein the flaps on contiguous strips are staggered with respect to each other.

8. The method as described in claim 1, wherein at least one end of each flap is notched to clear the overlapped marginal edge portions of the strips.

9. The method as described in claim 8, wherein the successive flaps on laterally contiguous strips are staggered with respect to each other.

10. A single-ply roofing system comprising, parallel strips of fiber-reinforced membrane sheeting laid undoubled on a roof deck with their longitudinal marginal edge portions contiguous, mechanical fastener means securing at least one marginal edge portion of each strip to the deck at longitudinal intervals, the marginal edge portions being bonded together, each of said membrane strips having transverse membrane flaps at longitudinal intervals substantially coextensive to said strips in width one transverse edge portion of each flap being secured to the undersurface of the strip, and mechanical fastener means securing said flaps to said deck at transverse intervals.

11. A single-ply roofing system as described in claim 10, wherein at least one end of each flap is notched to clear the contiguous marginal edge portions of the strips.

12. A single-ply roofing system as described in claim 11, wherein the successive flaps of contiguous strips are staggered with respect to each other.

13. A single-ply roofing system as described in claim 12, wherein said flaps are spaced apart at intervals of about five to six feet.

14. A single-ply roofing system as described in claim 13, wherein said membrane strips are at least 10 feet wide.

15. A single-ply roofing system as described in claim 10, wherein one marginal edge portion of each strip is lapped over and bonded to the mechanically fastened edge portion of the next contiguous strip.

16. A single-ply roofing system as described in claim 15, wherein at least one end of each flap is notched to clear the overlapped mechanically fastened edge portion of the next contiguous strip.

17. A single-ply roofing system as described in claim 16, wherein the successive flaps of contiguous strips are staggered with respect to each other.

18. A single-ply roofing system as described in claim 10, wherein the successive flaps of contiguous strips are staggered with respect to each other.

19. A single-ply roofing system as described in claim 18, wherein said flaps are spaced apart at intervals no greater than five feet.

20. A single-ply roofing system as described in claim 19, wherein said membrane strips are at least 10 feet wide.

21. A single-ply roofing system as described in claim 10, wherein said flaps are spaced apart at intervals no greater than five feet.

22. A single-ply roofing system as described in claim 21, wherein said membrane strips are at least 10 feet wide.

* * * * *